Nov. 14, 1950 G. W. FYLER 2,530,329

TELEVISION RECEIVER ANTENNA INPUT CIRCUIT

Filed April 24, 1947 2 Sheets-Sheet 1

INVENTOR.
George W. Fyler

BY Foorman L. Mueller

Attorney

Nov. 14, 1950 G. W. FYLER 2,530,329

TELEVISION RECEIVER ANTENNA INPUT CIRCUIT

Filed April 24, 1947 2 Sheets-Sheet 2

INVENTOR.
George W. Fyler
BY
Norman L. Mueller
Attorney

Patented Nov. 14, 1950 2,530,329

UNITED STATES PATENT OFFICE 2,530,329

TELEVISION RECEIVER ANTENNA INPUT CIRCUIT

George W. Fyler, Lombard, Ill., assignor to Motorola, Inc., a corporation of Illinois Application April 24, 1947, Serial No. 743,700

11 Claims. (Cl. 250—20)

This invention relates generally to television receivers and in particular to a television receiver in which a high gain is obtained with a minimum number of tubes.

In prior television receivers in order to produce the gain required for providing a video signal suitable for modulating the cathode ray beam and for holding the deflection generators in synchronism, a very large number of stages of amplification and a corresponding large number of vacuum tubes have been required. This has resulted in television receivers being large, both because of the space required for the tubes and because a relatively large power supply is required for providing operating potentials for the tubes. Various attempts have been made to increase the gain of various stages of television receivers to thereby provide the over-all gain required in fewer stages, but difficulty has been encountered as the technique for handling signals in the frequencies now used for television and also the specific technique required for handling a carrier wave modulated by the wide band of frequencies are not well known.

In particular, antenna circuits used in prior art television circuits have been inefficient usually resulting in a large loss of signal strength, at least for some of the frequencies to be received. Further, due to the very high frequencies involved, inductances provided by leads, switches, etc., are relatively large making the components very critical and the manufacture and assembly thereof both difficult and expensive. These problems have often resulted in a poor match between the antenna and the first stage of the receiver resulting in little or no gain in the stage.

It is, therefore, an object of the present invention to provide a small television receiver in which relatively high gain is provided by fewer stages of amplification.

A further object of this invention is to provide an improved antenna circuit for a television receiver which is of simple construction and provides high signal gain.

A feature of this invention is the provision of a television receiver including an antenna circuit which may be efficiently connected to either a coaxial cable transmission line or a balanced line.

A further feature of this invention is the provision of an antenna circuit for coupling an antenna to the radio frequency amplifier of a television receiver in which the inductive coupling is made through a bus bar tapped at predetermined intervals to thereby avoid use of small and critical coil units, and to provide optimum coupling on a plurality of channels without switching in the primary side of the coupling circuit.

Another feature of this invention is the provision of an antenna circuit for coupling an antenna to a radio frequency amplifier which includes a plurality of circuits tunable to predetermined channels and a switch for selecting one of these channels and in which the switch is connected to the radio frequency amplifier through an inductance to reduce the effect of the switch capacity.

Further objects, features and advantages will be apparent from a consideration of the following description taken in accordance with the accompanying drawings in which.

In practicing my invention I provide a wave signal receiver of the superheterodyne type capable of receiving television signals including modulated composite video signals and sound signals and deriving video, synchronization, and sound signals therefrom. The receiver includes an antenna circuit having a coil with two closely coupled portions of such construction that one portion thereof provides an optimum matching impedance for a 75 ohm coaxial cable lead-in and the entire coil provides an optimum impedance to match a 300 ohm transmission line. The coil also forms part of a high pass filter for improving the intermediate frequency rejection ratio of the receiver. The received signal is applied to a bus bar which is tapped at predetermined intervals corresponding to the various television channels and selectively coupled through a plurality of inductors so that maximum signal is applied to the first stage of the receiver for each of these channels. The signal from the antenna circuit is applied to a radio frequency amplifier wherein the signals are further selected and amplified and then converted into intermediate frequency signals. The antenna circuit and converter grid circuit are stagger-tuned to provide sufficient band width for both the video and audio signals. The video and audio signals are passed through a common intermediate frequency amplifier, detector and video amplifier after which the signals are separated and applied to audio and video systems in the usual manner.

Figure 1:
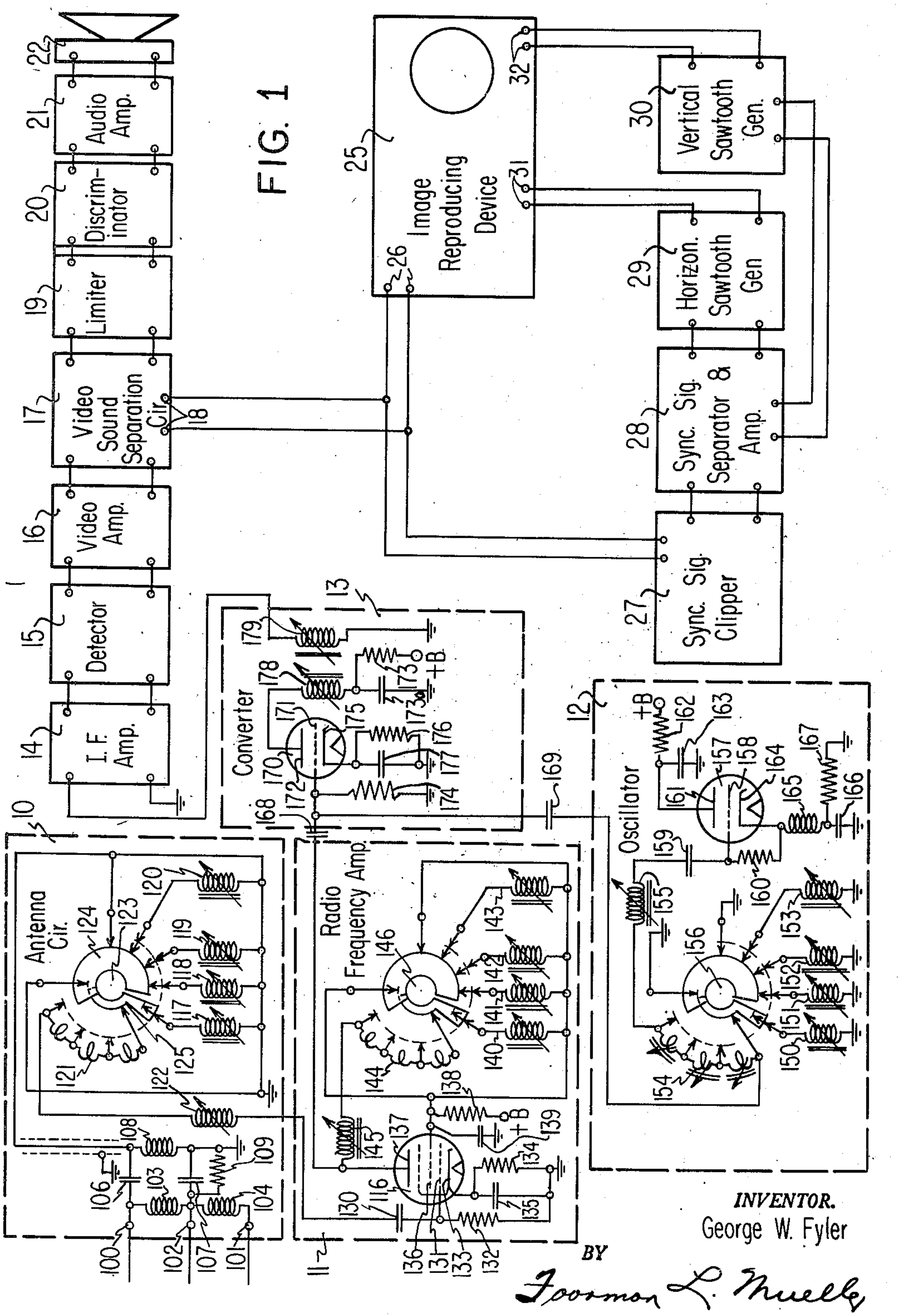
Fig. 1 is a circuit diagram of the television receiver in accordance with the invention.

Referring now to the drawings, Fig. 1 shows the circuit of the wave signal receiver in accordance with the invention with the components thereof which do not form a part of the invention shown in block diagram. The receiver is illustrated as including an antenna circuit 10 adapted to be connected to an antenna and to apply a signal therefrom to radio frequency amplifier 11. A tunable local oscillator 12 is provided which provides oscillations for converting the signals from the radio frequency amplifier into intermediate frequency signals. This function is accomplished in converter 13 from which the signals are applied to an intermediate frequency amplifier 14. The incoming signal includes two separate carrier waves, one modulated by the composite video signal and the other modulated by the audio signal, and these signals are converted into two separate intermediate frequency signals both of which are amplified in the intermediate frequency amplifier 14. The amplified intermediate frequency signals are applied to detector 15 wherein the video signal is derived from its carrier wave and the audio and video carrier waves are heterodyned to provide an audio frequency modulated carrier wave of a frequency which is the difference between the original audio and video carrier waves (4.5 mc.). The video signal and the low frequency audio modulated waves are amplified by video amplifier 16 and applied to video sound separation circuit 17. The video signal is derived from this circuit and applied to terminals marked 18. The audio signal is then applied to a limiter stage 19 and to discriminator 20 which may be of any well known type such as a ratio detector wherein the frequency modulated wave is converted to an amplitude modulated wave. The audio wave is further amplified in the audio amplifier 21 and then applied to the sound translating device 22.

The video signal appearing at the terminals 18 of the video sound separation circuit are applied to an image reproducing device 25, the signals being applied to terminals 26 connected to the control element thereof so that the intensity of the image reproducing beam is controlled by the signal strength. The video signal is also applied to a synchronization signal clipper 27 which removes the synchronization pulses from the composite video signal and applies them to synchronization signal separator and amplifier 28. The horizontal and vertical synchronization pulses are separated and individually applied to horizontal sawtooth generator 29 and vertical sawtooth generator 30 which are connected to terminals 31 and 32 of the image reproducing device 25 for energizing the horizontal and vertical deflecting means thereof. Either electromagnetic or electrostatic deflecting means may be used, the generators being adapted to provide either sawtooth current waves or sawtooth voltage waves depending on whether electromagnetic or electrostatic deflection is used. In order to simplify the illustration of the invention, the intermediate frequency, sound and image reproducing components are illustrated by block diagrams and the power supply system is not illustrated as these components do not constitute a part of the present invention.

Figures 2, 3:
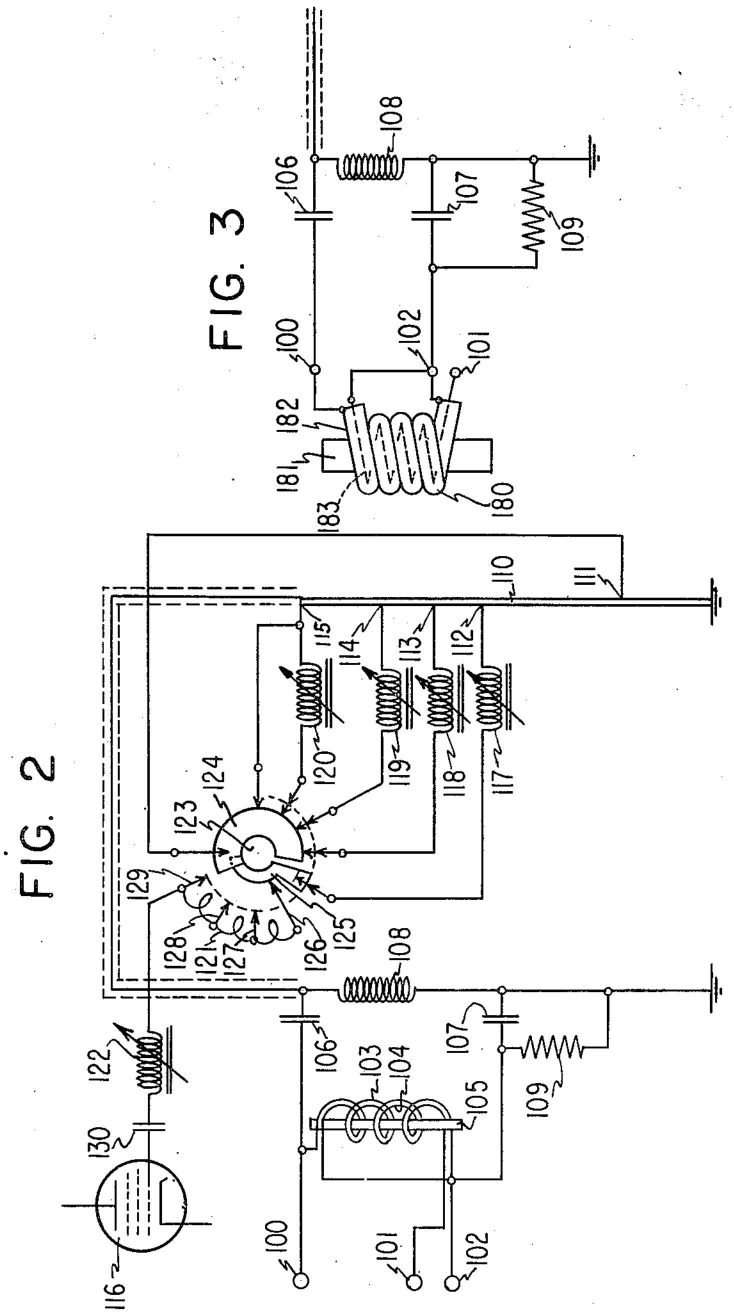
Fig. 2 is a schematic diagram illustrating the details of the improved antenna circuit.
Fig. 3 illustrates a modified antenna coupling circuit.

Referring now more particularly to the antenna circuit 10, reference is made to Fig. 2 wherein the antenna circuit is shown in more detail. This circuit includes terminals 100, 101, and 102 which are connected to a coil composed of portions 103 and 104. The coil portion 103 is connected between terminals 100 and 102 and the coil portion 104 is connected between the terminals 102 and 101. The characteristics of the coil are so related to the impedance of the antenna circuit that the portion of the coil between the terminals 100 and 102 provides a proper impedance match for a 75 ohm coaxial unbalanced lead-in and the entire coil extending between terminals 100 and 101 provides an optimum matching impedance for a 300 ohm balanced transmission line. The inductance of the portion 103 is determined by well known formulas so that the cut-off frequency thereof is equal to the geometric mean between the highest intermediate frequency and the lowest radio frequency to be used. For a receiver adapted to operate on presently assigned television channels and with audio and video intermediate frequencies of 21.9 and 26.4 megacycles, respectively, this frequency is approximately 35 megacycles. The coil portion 104 is connected to terminal 101 with as short a lead as possible to minimize the coupled-in stray capacitance.

A satisfactory coil for use as described above can be provided by forming the two coil portions 103 and 104 of fine insulated wire which are twisted about each other and wound about a coil form as indicated at 105 (Fig. 2) so that the two portions thereof are very closely coupled. To cover present television frequencies, four turns of No. 40 wire were used as each portion, and the portions twisted about each other and wound on a ⅜ inch diameter form. This was found to provide the proper impedance for each portion and proper mutual coupling with reasonably good balance. In such a coil the coefficient of coupling between the two coil portions was found to be approximately .8.

An alternative arrangement found to be satisfactory as an antenna input coil is illustrated in Fig. 3. This coil comprises a piece of small concentric cable 180 wound about a small coil form 181. The cable includes an outer conductor 182 which is used in the same manner as coil portion 103 of Fig. 2 and a central conductor 183 which is used in the same manner as coil portion 104. A common connection is made at terminal 102 with the outer conductor at one end of the coil and the center conductor at the other end to form a circuit completely equivalent to that shown in Fig. 2. Such a coil provides a very high coefficient of coupling between the two conductors, approaching 100 per cent. In order to reduce the capacity of such a cable the diameter of the center conductor may be kept small.

Referring now to the operation of the input circuit, the coil portion 103 cooperates with capacitors 106 and 107 and inductor 108 to form a high pass input filter which improves the intermediate frequency rejection ratio of the receiver. The incoming signal is applied to a bus bar 110 which is a strip of material as illustrated in Fig. 2. The length of the bus bar 110 is such that the inductance thereof is optimum for coupling to the tube of the radio frequency amplifier at the lowest frequency to be received. The length required can be computed according to well known formulas based upon the input resistance of the radio frequency amplifier, the frequency to be received and the inductance of the bus bar per unit length. In computing the input impedance of the radio frequency amplifier, consideration must be given to the added circuit damping which may be required to achieve the desired band width, particularly on the lowest frequency channels. Thus, the value of resistor 109 is chosen to insure adequate band width on the lower channel.

In order to provide efficient transmission of the signal from the antenna circuit to the radio frequency amplifier on all the television channels, the bus bar 110 is tapped at points 111, 112, 113 and 114 which provide optimum coupling at the various channels. The points where the taps must be placed for the various frequencies can be computed as stated above. At the higher frequencies, a single tap can be used for more than one channel and in such cases a compromise point is used. Connection is made from the taps on the bus bar 110 to the grid of tube 116 which is the tube of radio frequency amplifier 11, through a plurality of inductors 117 to 121, inclusive, which may be selectively incircuited by switch 123 and through inductor 122 and capacitor 130. The switch 123 includes two separate movable contact members 124 and 125 which are mechanically connected for simultaneous movement but which are electrically insulated from each other. Contact member 125 makes the circuit connection for the desired channel and member 124 shorts the coils of lower frequency than the channel selected to prevent absorption points in the higher radio frequency bands. The coil 121 has a plurality of connections indicated at 126, 127, 128 and 129 so that various portions of the coil may be included in the circuit. It is noted that the contacts connected to coil 121 and the contacts connected to coils 117, 118, 119 and 120 are spaced so that they will be selectively engaged by the movable contact members 124 and 125. It is to be noted that the coils are connected in series in the channels in the high frequency band and in parallel in the channels in the lower frequency band to provide the desired coupling as will be more fully explained.

In the position of the switch shown, connection is made from tap 112 through inductor 117, through the switch contacts and through inductors 121 and 122. When the switch is turned so that connection is made to the channel corresponding to tap 113 the inductors 118, 121 and 122 will be connected in series. It is obvious that connection can be made to taps 114 and 115 in a similar manner. In connecting the circuit for reception of a channel in the high frequency television band, the switch 123 is rotated so that the movable contact 125 connects the tap 111 through inductors 121 and 122 to the amplifier tube 116. The position of the tap 111 is selected so that the inductance will be a good compromise value for the seven high frequency channels and these channels may be selected by making contact through the various portions of the inductor 121 and by adjustment of inductor 122.

The placing of inductor 122 between the switch and the tube instead of between the bus bar and the switch reduces the effect of the capacity of the switch on all channels, as the switch is connected at a lower potential point. The inductance of coil 122 may be adjusted to tune the antenna circuit to the highest frequency channel, only the inductance in the lead being provided from the point 111 to the switch for this channel. The variable inductors 117, 118, 119 and 120 may be adjusted to tune the antenna circuit to the other channels, one of these inductors being connected in series with inductors 121 and 122 when a particular channel is selected.

It is pointed out that the variable inductors such as 117, 118 and 122 of the antenna circuit may be tunable through a sufficient range so that more than one television channel can be covered by a particular setting of the switch. Although any suitable type of variable inductance may be used, movable iron core inductances have been found satisfactory. According to the present system of assigning channels, only certain channels will be assigned in any one location. Therefore, it is not necessary to have coils for each of the 13 presently assigned channels, but by using coils which can be tuned to a plurality of channels, the channels available in any area can be set up and these stations selected by operation of the ganged switches.

In a receiver actually constructed the positions of the taps 115 and 114 are selected to provide optimum inductances for receiving the No. 1 and No. 2 television channels (lowest frequency), respectively. Tap 113 was selected at a compromise value for channels 3 and 4 and tap 112 was selected at a compromise value for channels 5 and 6. As in any area, only channels 3 and 5 or channels 4 and 6 will be assigned, the inductors 118 and 117 can be adjusted to properly tune the receiver to channels 3 and 5 or 4 and 6, respectively, and by such adjustment all of the low frequency channels available in an area are available and can be selected by operation of the switch 123. As previously stated, the tap 111 is positioned to provide an inductance value which is a good compromise value for all the high frequency channels, that is, channels 7 to 13. As in the case of channels 3 to 6, channels 7 to 13 will not all be assigned in the same area, either channels 7, 9, 11 and 13 being assigned or channels 8, 10 and 12. The value of inductance between the taps of the inductor 121 is chosen to provide the required separation between alternate high frequency channels so that the inductor 122 can be adjusted to a value so that the receiver is tuned to channels 7, 9, 11 and 13, respectively, when the contacts 126, 127, 128 and 129, respectively, are engaged by the projection on movable contact 125 of the switch 123. Alternatively the inductor 122 can be adjusted so that the receiver is tuned to channels 8, 10 and 12 when contact is made with contacts 126, 127 and 128.

The radio frequency amplifier 11 includes a pentode tube 116 having a grid 131 to which the signal is applied, the grid 131 being held at fixed bias by resistor 132. The cathode 133 is biased by resistor 134 which is by-passed by condenser 135. The screen grid 136 and plate 137 of the tube are connected to a source of potential marked +B through the resistor 138, a condenser 139 being provided for by-passing high frequencies. The plate circuit is coupled through a plurality of tuning inductances as will be explained. It is noted that the tube 116 of radio frequency amplifier 11 is operated at fixed bias, no gain control being provided. This is necessary to provide correct impedance match to the input circuit irrespective of signal levels. This tube is arranged to operate at maximum gain at all times, the over-all gain of the receiver being controllable only by controlling the gain of the converter and intermediate frequency stages of the receiver. The plate circuit of the amplifier is tuned by a plurality of inductors 140 to 145, inclusive, which are arranged in the same manner and correspond to the same television channels as the inductances of the antenna circuit. It is noted that the inductor 145 for the highest frequency is placed directly in the plate lead to reduce the effect of the capacity of the switch 146 in the same manner as in the antenna circuit. These inductors are adjusted so that the converter grid circuit is resonant at a frequency slightly higher than that of the antenna circuit providing a staggered effect which is effective to increase the band width of the receiver.

The oscillator 12 employs a third set of inductors 150 to 155, inclusive, and a switch 156 generally similar to those of the antenna and radio frequency circuits. The switches 146 of the radio frequency amplifier and 156 of the oscillator function in the same manner as the switch 123 of the antenna circuit and the three switches are ganged so that the desired channel may be selected by the use of a single control. The inductors 144 and 154 are tapped similarly to the inductor 121. The individual portions of the coil 154 are tuned by iron cores to permit adjustment of the oscillator frequency for accurate alignment of the receiver. Therefore, it is obvious that the amplifier and oscillator circuits can be tuned in the same manner as the antenna circuit and the three circuits are simultaneously tuned by operation of the ganged switches. The oscillator includes a triode 157 having a grid 158 coupled to the tuning inductances through capacitor 159 and biased by resistor 160. The plate 161 is connected to a source of potential marked +B through resistor 162, capacitor 163 providing a by-pass for high frequencies. The cathode 164 is grounded through inductor 165 and resistor 167 connected in series, resistor 167 being by-passed by condenser 166.

The amplified signals from the radio frequency amplifier are converted to intermediate frequency signals by converter 13 which includes a triode vacuum tube 170. The triode 170 and triode 157 of the oscillator 12 may be combined in one envelope if desired. The radio frequency signals are applied to the grid 171 of the triode 170 through coupling condenser 168 and the oscillator is coupled to the grid through condenser 169. The grid 171 is biased by resistor 174 and the cathode 175 of the tube is biased by the resistor 176 which is by-passed by condenser 177. The plate circuit of the converter tube is tuned by a pair of inductively coupled coils 178 and 179 the inductances of which are individually adjustable as by the use of movable iron cores. Coil 178 is connected to the plate 172 of tube 170 and through resistor 173 to a source of potential marked +B. Condenser 173$a$ provides a high frequency by-pass. The inductively coupled coil 179 is connected to the intermediate frequency amplifier 14.

It is, therefore, seen that I have provided a television receiver in which the antenna circuit is improved and in which the tuning of the entire high frequency components is very much simplified. The antenna circuit permits the receiver to be coupled to either a coaxial lead-in or a balanced 300 ohm transmission line. The coupling components in accordance with the invention are much simpler to construct and are less critical than in systems heretofore used at the high frequencies now used for television. The system results in a simplification of a means for selecting channels in the antenna circuit and provides a better match for all the channels within the television band than prior art systems.

Although I have described certain embodiments which are illustrative of my invention, it is apparent that various changes and modifications can be made therein without departing from the intended scope of the invention as defined in the appended claims.

I claim:

1. In a wave signal receiver operable on a plurality of channels in the very high frequency range, a system for coupling an antenna to the receiver comprising, an input circuit coupled to said antenna, an output circuit coupled to said receiver, and a bus bar for coupling said input and output circuits, said input circuit being connected to said bus bar for applying the signal from said antenna thereto, said bus bar having a plurality of taps positioned along the length thereof, said output circuit including a plurality of inductors and switch means having contacts, said inductors being individually connected between said taps and said contacts, said switch means selectively connecting one of said inductors and said entire bus bar in said output circuit for operation on the channel of lowest frequency and for connecting progressively other inductors and smaller portions of said bus bar in said output circuit for operation on channels of progressively higher frequency.

2. In a wave signal receiver operable on a plurality of channels in the very high frequency range, a system for coupling an antenna to the receiver comprising, an input circuit coupled to said antenna, an output circuit coupled to said receiver, and a bus bar for coupling said input and output circuits, said input circuit being connected to said bus bar for applying the signal from said antenna thereto, said bus bar having a plurality of taps positioned along the length thereof, said output circuit including a plurality of tuning circuits individually connected to said taps for tuning said output circuit to said channels, and switch means having contacts connected to said tuning circuits for selectively connecting one of said tuning circuits and said entire bus bar in said output circuit for operation on the channel of lowest frequency and for connecting other tuning circuits and progressively smaller portions of said bus bar in said output circuit for operation on channels of progressively higher frequency.

3. In a wave signal receiver operable on a plurality of channels in the very high frequency range, a system for coupling an antenna to the receiver comprising, an input circuit coupled to said antenna, an output circuit coupled to said receiver, and a bus bar for coupling said input and output circuits, said input circuit being connected to said bus bar for applying the signal from said antenna thereto, said bus bar having a plurality of taps positioned along the length thereof, said output circuit including switch means and a plurality of inductors, said switch means having a plurality of fixed contacts and a movable contact, predetermined ones of said inductors being individually connected between said taps and predetermined ones of said fixed contacts, an additional one of said inductors being variable and being connected to an additional one of said fixed contacts, said movable contact selectively connecting said additional variable inductor in series with one of said predetermined inductors for selectively connecting said entire bus bar in said output circuit for operation on the channel of lowest frequency and for connecting progressively smaller portions of said bus bar in said output circuit for operation on channels of progressively higher frequency, said variable inductor adjusting the tuning of said output circuit.

4. In a wave signal receiver operable on a plurality of channels in the very high frequency range, a system for coupling an antenna to the receiver comprising, an input circuit coupled to said antenna, an output circuit coupled to said receiver, a bus bar for coupling said input and output circuits, said input circuit being connected to said bus bar for applying the signal from said antenna thereto, said bus bar having a plurality of taps positioned along the length thereof, switch means including a plurality of fixed contacts and a movable contact, a plurality of inductors individually connected between said taps and said fixed contacts, said movable contact being connected to said output circuit for selectively interconnecting said inductors thereto for coupling said output circuit to said entire bus bar for operation on the channel of lowest frequency and coupling said output circuit to progressively smaller portions of said bus bar for operation on channels of progressively higher frequency.

5. In a wave signal receiver operable on a plurality of channels in the very high frequency range, a system for coupling an antenna to the receiver comprising an input circuit coupled to said antenna, an output circuit coupled to said receiver, a bus bar for coupling said input and output circuits, said input circuit being connected to said bus bar for applying the signal from said antenna thereto, said bus bar having a plurality of taps positioned along the length thereof, circuit means for tuning said output circuit to said channels connected to said taps, and switch means connected to said circuit means and to said output circuit for selectively interconnecting the same for coupling said output circuit to said entire bus bar for operation on the channel of lowest frequency and coupling said output circuit to progressively smaller portions of said bus bar for operation on channels of progressively higher frequency, said switch means shorting said circuit means for channels of lower frequency than the channel selected.

6. In a wave signal receiver operable on a plurality of channels in the very high frequency range, a system for coupling an antenna to the receiver comprising an input circuit coupled to said antenna and an output circuit coupled to said receiver, a bus bar for coupling said input and output circuits, said input circuit being connected to said bus bar for applying the signal from said antenna thereto, said bus bar having a plurality of taps positioned along the length thereof, switch means including a plurality of fixed contacts and at least one movable contact, and a plurality of circuit means individually connecting said taps to predetermined ones of said fixed contacts, said output circuit including an inductor having a plurality of taps thereon connected to other of said fixed contacts, said movable contact selectively connecting said inductor to one of said predetermined fixed contacts for coupling said output circuit to said entire bus bar for operation on the channel of lowest frequency and for coupling said output circuit to progressively smaller portions of said bus bar for operation on channels of progressively higher frequency, said movable contact selectively shorting out sections of said inductor for tuning said output circuit.

7. In a wave signal receiver operable on a plurality of channels in the very high frequency range, a system for coupling an antenna to the receiver comprising an input circuit coupled to said antenna and an output circuit coupled to said receiver, a bus bar for coupling said input and output circuits, said input circuit being connected to said bus bar for applying the signal from said antenna thereto, said bus bar having a plurality of taps positioned along the length thereof, switch means including a plurality of fixed contacts and a pair of movable contacts, and a plurality of circuit means for tuning said output circuit to said channels individually connected between said taps and predetermined ones of said fixed contacts, said output circuit including an inductor having a plurality of taps thereon connected to other of said fixed contacts, one of said movable contacts selectively connecting said inductor to one of said predetermined fixed contacts for coupling said output circuit to said entire bus bar for operation on the channel of lowest frequency and for coupling said output circuit to progressively smaller portions of said bus bar for operation on channels of progressively higher frequency, said one movable contact selectively shorting out sections of said inductor for tuning said output circuit, the other one of said movable contacts interconnecting said circuit means for channels of lower frequency than the channel selected.

8. In a wave signal receiver operable on a plurality of channels in the very high frequency range, a system for coupling an antenna to the receiver comprising an input circuit coupled to said antenna and an output circuit coupled to said receiver, a bus bar for coupling said input and output circuits, said input circuit being connected to said bus bar for applying the signal from said antenna thereto, said bus bar having a plurality of taps positioned along the length thereof, switch means including a plurality of fixed contacts and at least one movable contact, and a plurality of circuit means individually connecting said taps on said bus bar to predetermined ones of said fixed contacts, said output circuit including a tapped inductor and a variable inductor connected in series, said tapped inductor having the taps thereof connected to other of said fixed contacts, said movable contact selectively connecting said inductors to said predetermined fixed contacts for coupling said output circuit to said entire bus bar for operation on the channel of lowest frequency and for coupling said output circuit to progressively smaller portions of said bus bar for operation on channels of progressively higher frequency, said movable contact selectively shorting out sections of said inductor for tuning said output circuit, said variable inductor being adjustable for further tuning of said output circuit.

9. A variable inductance means for a television tuner comprising an elongated bar conductor having a plurality of taps positioned along the length thereof, with the portions of said bar conductor defined by said taps having predetermined values of inductive reactance depending upon the length thereof, first terminal means connected to said bar conductor, a second elongated conductor having series-arranged coil portions therein to afford a plurality of inductive reactances, said second conductor having a plurality of taps positioned along the length thereof, second terminal means connected to said second conductor, and tap-changing switch means cooperating selectively with the taps on both of said conductors to place a selected amount of inductive reactance between said first terminal means and said second terminal means.

10. A system for coupling a wave signal receiver which is operable on a plurality of channels in a range of frequencies to an antenna, said system including in combination, an input circuit coupled to said antenna, an output circuit coupled to said receiver, and a conducting bar having at least a portion thereof common to said input and output circuits for coupling said circuits, said input circuit applying the signal from said antenna to said conducting bar, said output circuit including a plurality of tuning means individually connected to a plurality of points on said conducting bar, and switch means connected to said tuning means for selectively interconnecting the same, said points on said conducting bar defining portions having such lengths to provide predetermined values of inductive reactance for coupling said input circuit and said output circuit at the various frequencies of the individual channels, said switch means coupling one portion of said conducting bar in said output circuit for operation on a channel of one frequency and effectively coupling portions of said conducting bar which are progressively smaller than said one portion in said output circuit for operation on channels of frequencies which are progressively higher than said one frequency.

11. A system for coupling a wave signal receiver which is operable on a plurality of channels in a range of frequencies to an antenna, said system including in combination, an input circuit coupled to said antenna, an output circuit coupled to said receiver, and a conducting bar conductively connected to said input and output circuits and having at least a portion thereof common to said circuits for coupling the same, said input circuit applying the signal from said antenna to said conducting bar, said output circuit including a plurality of tuning means individually connected to a plurality of points on said conducting bar, and switch means connected to said tuning means for selectively interconnecting the same, said points on said conducting bar defining a plurality of portions thereof having such lengths to provide predetermined values of inductive reactance for coupling said input circuit and said output circuit at the various frequencies of the individual channels, said switch means coupling said common portion of said conducting bar in said output circuit for operation on the channel of lowest frequency and effectively coupling portions of said conducting bar which are progressively smaller than said common portion in said output circuit for operation on channels of progressively higher frequency.

GEORGE W. FYLER.

REFERENCES CITED

The following references are of record in the file of this patent:

UNITED STATES PATENTS

| Number | Name | Date |
|---|---|---|
| 1,257,657 | Weagant | Feb. 26, 1918 |
| 1,778,395 | Lindenblad | Oct. 14, 1930 |
| 2,075,128 | Mouromtseff et al. | Mar. 30, 1937 |
| 2,165,058 | Kinn | July 4, 1939 |
| 2,198,437 | Kaufman | Apr. 23, 1940 |
| 2,211,458 | Curtis | Aug. 13, 1940 |
| 2,216,160 | Curtis | Oct. 1, 1940 |
| 2,348,325 | Brown | May 9, 1944 |
| 2,360,475 | Chattergea et al. | Oct. 17, 1944 |
| 2,408,896 | Turner | Oct. 8, 1946 |
| 2,416,322 | Kellogg | Feb. 25, 1947 |

FOREIGN PATENTS

| Number | Country | Date |
|---|---|---|
| 223,258 | Great Britain | Oct. 17, 1924 |